Patented Dec. 7, 1937

2,101,103

UNITED STATES PATENT OFFICE 2,101,103

METHOD OF TREATING MILK

Edward W. Smith, Melrose, Mass., assignor to Submarine Signal Company, Boston, Mass., a corporation of Maine No Drawing. Application March 17, 1936, Serial No. 69,365

8 Claims. (Cl. 99—54)

The present invention relates to a method for the treatment of milk. More particularly the present invention relates to a method for the treatment of milk to bring about curd-tension reduction and homogenization.

It is well known that the curd tension of whole milk from various cows tends to vary and on the average is quite high. It has been determined that milk with a low-curd tension is more easily digestible than milk with a high-curd tension. Consequently it is desirable to reduce the curd tension of milk intended for human consumption to a reasonable value. This can be accomplished in a number of ways, one of which is by the use of a pressure homogenizer.

A pressure homogenizer is an apparatus for forcing the milk under pressure through a small orifice. However, in order to obtain a satisfactory curd-tension reduction with a pressure homogenizer it has been found necessary to operate the device at a very high pressure, usually about 2000 pounds per square inch. If this is done, the fat particles in the milk are very finely subdivided and thoroughly dispersed in the milk. In fact, it has been found to be extremely difficult subsequently to separate much of the butter fat from the milk after treatment in the pressure homogenizer.

Nevertheless it is often desirable to provide milk which is sufficiently well homogenized so that the cream will not rise if the milk be left standing for a period of 24 to 48 hours. The advantages of homogenized milk is coming to be more and more recognized. Since the cream does not readily rise to the top of the container, it cannot be removed by unauthorized persons.

Furthermore, where milk is sold in paper containers, it is found that the cream which rises to the top of unhomogenized milk tends to stick to the container, which is not true of homogenized milk. Finally, it also has been found that homogenized whole milk has an improved flavor and texture and is better liked by children. For consumption by children it is also particularly desirable that the milk have a low-curd tension.

On the other hand, it is customary for dairies to take back from milk dealers milk which was not sold during the preceding day. Such returned milk is of value to the dairy, chiefly for its butter fat content. If, however, the butter fat cannot be separated from the milk, then the returned milk is of comparatively little value.

Now, it has been found that it is not necessary, in order to obtain a satisfactory curd-tension reduction, to disperse finely more than a very small quantity of butter fat in the milk. The amount of butter fat required is approximately one half of one percent of the total volume of milk. Based upon this fact the present invention provides a new method for treating milk to produce by means of a pressure homogenizer a homogenized milk with a satisfactorily low-curd tension but from which the cream or butter fat may readily be extracted by means, for example, of a centrifuge, such as the common cream separator.

According to the present invention the whole milk to be treated is allowed to stand in a settling tank for a few hours, thus giving the majority of the cream time to rise toward the top of the tank. There is, then, still a small quantity of butter fat mixed in with the milk at the bottom of the tank. The body of the milk which lies below the cream which has risen in the tank is then run through the pressure homogenizer under high pressure, say, approximately 2000 pounds per square inch. The pressure is then reduced to a low pressure, say, approximately 500 pounds per square inch, at which pressure the remainder of the milk and cream is passed through the homogenizer. The two portions of the milk are again mixed after treatment. At the high pressure the dispersed fat particles are for the most part too small to permit them to rise or to be separated from the milk by a separator. At the lower pressure, on the other hand, the fat particles are large enough so that while they will rise only very slowly, they can, nevertheless, readily be separated with a separator.

There is thus produced a homogenized milk in which the cream is sufficiently well dispersed so that it will not rise for the desired length of time while at the same time its curd tension has been reduced and yet the cream can readily be separated from the milk if desired.

It will be understood that the length of time which the whole milk should be allowed to stand before treatment in order to permit the majority of the cream to rise to the top of the settling tank will vary with conditions, such as the character of the milk as determined by the kind of cows it was obtained from, the temperature in the settling tank and other factors. Likewise, the proportion of the whole milk which is passed through the homogenizer at high pressure and the proportion which is passed through the homogenizer at a low pressure will vary somewhat, depending upon the length of time which it is desired that the cream shall remain substantially evenly dispersed in the milk. So also the particular pressures employed will depend to some extent upon the characteristics of the particular homogenizer being used.

As an example, it is believed that it will usually be found satisfactory to allow the whole milk to stand in a settling tank in the usual temperature for a period of three or four hours, after which time the lower 80% of the milk is passed through the pressure homogenizer at a pressure of approximately 2000 pounds per square inch while the remaining milk is passed through the homogenizer at approximately 500 pounds per square inch, the two portions being again mixed immediately after treatment.

It will be understood, of course, that some changes may be made in the method set forth in order to meet the convenience of a particular dairy or set of circumstances existing, and yet remain within the spirit of the present invention. It may, for example, be desirable or convenient initially completely to separate the cream from the whole milk, then to mix with the skimmed milk approximately one half of one percent of cream, this mixture being passed through the homogenizer at a high pressure. The cream with some skimmed milk added may then be passed through the homogenizer at a low pressure and the two portions subsequently mixed.

Having now described my invention, I claim:

1. Method of treating whole milk with a pressure homogenizer which comprises allowing the whole milk to stand long enough to permit the majority of the cream content to rise to the top of the body of the milk, passing the majority of the milk containing only a small portion of the cream through the pressure homogenizer at a high pressure, passing the remaining milk and cream through the pressure homogenizer at a low pressure and subsequently mixing both homogenized portions.

2. Method of treating whole milk with a pressure homogenizer which comprises separating the majority of the cream from the milk, passing the majority of the separated milk together with a very small proportion of the cream through a pressure homogenizer at a high pressure, passing the separated cream together with a small proportion of milk through the pressure homogenizer at a low pressure and mixing the homogenized portions.

3. A method of treating whole milk which comprises allowing the whole milk to stand for a period of three hours whereby the majority of the cream content of the whole milk rises to the top of the body of milk, passing the lower 80% of the body of milk through a pressure homogenizer at a pressure of 2000 pounds per square inch, passing the remaining upper 20% of the body of milk through the homogenizer at a pressure of 500 pounds per square inch and subsequently mixing the two homogenized portions.

4. Method of producing homogenized milk with a low curd tension which comprises passing milk containing substantially one half of one per cent of butter fat through a pressure homogenizer at a high pressure, passing sufficient cream to bring the final product up to the desired standard of butter-fat content together with a small quantity of milk through the homogenizer at a low pressure and subsequently mixing the two homogenized portions.

5. Method of treating whole milk which comprises separating the majority of the cream from the milk, passing the majority of the separated milk together with a very small proportion of the cream through a pressure homogenizer adjusted to produce a sufficiently fine dispersion of the cream in the milk to preclude substantial subsequent separation, passing the separated cream together with a small proportion of milk through the pressure homogenizer adjusted to disperse the cream in sufficiently large particles to permit subsequent separation thereof from the milk and mixing the two treated portions.

6. Method of treating whole milk with a pressure homogenizer which comprises allowing the whole milk to stand long enough to permit the majority of the cream content to rise to the top of the body of the milk, passing the majority of the milk containing only a small portion of the cream through the pressure homogenizer adjusted to produce a dispersion which will not subsequently readily separate, passing the remaining milk and cream through the pressure homogenizer adjusted to produce a dispersion which can be subsequently separated and mixing both homogenized portions.

7. Method of producing homogenized milk with a low curd tension which comprises dispersing in milk substantially one half of one percent of butter fat to a sufficiently small drop-size to preclude substantial subsequent separation thereof from the milk, dispersing in an additional quantity of milk sufficient butter fat to bring the final product up to the desired standard of butter-fat content to a sufficiently large drop-size to permit substantial subsequent separation thereof from the milk and mixing the two portions so treated.

8. Method of treating whole milk which comprises separating most of the cream from the milk, passing the separated milk containing a very small quantity of cream through a pressure homogenizer adjusted to produce a sufficiently fine dispersion of the cream in the milk to preclude substantial subsequent separation and thereby reduce the curd tension of the milk and passing the milk so treated together with the initially separated cream through the pressure homogenizer adjusted to disperse the cream in sufficiently large particles to permit subsequent separation thereof from the milk.

EDWARD W. SMITH.